United States Patent
Schmutz et al.

(10) Patent No.: US 6,487,187 B1
(45) Date of Patent: Nov. 26, 2002

(54) RANDOM ACCESS CONTROL CHANNEL GAIN CONTROL AND TIME SLOT RECOVERY FOR REMOTE IN-BAND TRANSLATOR IN TIME DIVISION MULTIPLE ACCESS WIRELESS SYSTEM

(75) Inventors: Thomas R. Schmutz, Indialantic, FL (US); Michael A. Komara, Indialantic, FL (US); Roger L. Overton, New York, NY (US); Jeffrey W. Smith, Palm Bay, FL (US); David D. Coons, Melbourne, FL (US); Jeffrey R. Nuckols, Indialantic, FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/198,808

(22) Filed: Nov. 24, 1998

Related U.S. Application Data (60) Provisional application No. 60/066,481, filed on Nov. 26, 1997.

(51) Int. Cl.$^7$ .......................... H04B 7/212; H04B 7/02; H04Q 7/20
(52) U.S. Cl. ..................... 370/337; 370/347; 455/101; 455/131; 455/422; 455/507
(58) Field of Search ................. 370/277, 280, 370/294, 321, 337, 347, 487, 490, 498, 503, 507; 455/101, 131, 422, 564, 507, 20

(56) References Cited

U.S. PATENT DOCUMENTS

| | | | | |
|---|---|---|---|---|
| 4,941,200 A | * | 7/1990 | Leslie et al. | 455/507 |
| 5,152,002 A | * | 9/1992 | Leslie et al. | 455/422 |
| 5,537,435 A | * | 7/1996 | Carney et al. | 370/280 |
| 5,544,171 A | * | 8/1996 | Godecker | 370/337 |
| 5,561,845 A | * | 10/1996 | Bendixen et al. | 455/443 |
| 5,649,292 A | * | 7/1997 | Doner | 455/447 |

* cited by examiner

Primary Examiner—Wellington Chin
Assistant Examiner—Maikhanh Tran
(74) Attorney, Agent, or Firm—Akerman Senterfitt

(57) ABSTRACT

In a conventional Time Division Multiple Access (TDMA) wireless system, the specified distance between a mobile unit and the base transceiver system (BTS) cannot exceed predetermined distances because of time slot synchronization constraints. Furthermore, the varying distances between mobile units and the BTS create timing differences in the random access control channel (RACCH) bursts in the initial uplink signal from the mobile stations. In this approach to extending TDMA system coverage, in-band translator components are located in the center of remote cells which would normally contain a base transceiver system. The in-band translators include a loop back circuit that permits a host BTS to measure the backhaul propagation time delay by sending test access signals between the host BTS and the distant in-band translators.

After backhaul timing delay is compensated in the BTS, then the in-band translator uses downlink time slot recovery to synchronize slot-by-slot uplink diversity selection and automatic level control.

Recovery of timing bursts on downlink from the BTS allows for determination of burst, frame, and multiframe timing for downlink and uplink in the in-band translator. Processing allows for pre-determination of which uplink time slots that the RAACH signal can appear from the mobile unit. This method allows for automatic level control during RAACH bursts in addition to normal uplink bursts.

5 Claims, 7 Drawing Sheets

RANDOM ACCESS CONTROL CHANNEL GAIN CONTROL AND TIME SLOT RECOVERY FOR REMOTE IN-BAND TRANSLATOR IN TIME DIVISION MULTIPLE ACCESS WIRELESS SYSTEM

This application claims benefit of provisional applications No. 60/066,481, filed Nov. 26, 1997.

FIELD OF THE INVENTION

This invention relates generally to wireless communication systems and in particular to a method of random access control channel synchronization compatible with time-slot synchronization and signal gain control for in-band translators deployed in peripheral cells of TDMA systems to extend the range of broadband Base Transceiver Systems (BTSs) in a cellular communication system.

BACKGROUND OF THE INVENTION

The demand for wireless communication services, such as Cellular Mobile Telephone (CMT), Personal Communication Services (PCS) and the like, typically requires the operators of such systems to serve an increasing number of users. As a result, a type base station equipment known as a MULTICARRIER broadband Base Transceiver Systems (BTS) has been developed which is intended to service a relatively large number of active mobile stations in each cell. Such broadband BTS equipment can typically service ninety-six simultaneously active mobile stations, at a cost of less than $2000 to $4000 per channel in 1998 dollars.

When coupled with efficient frequency reuse schemes, such as that described in U.S. Pat. No. 5,649,292 entitled "A Method For Obtaining Times One Frequency Reuse in Communication Systems" issued to John R. Doner and assigned to Air Net Communications Corporation, who is the assignee of the present application, maximum efficiency in densely populated urban environments is obtained. According to that arrangement, each cell is split into six radial sectors and frequencies are assigned to the sectors in such a manner as to provide the ability to reuse each available frequency in every third cell. Although this frequency reuse scheme is highly efficient, it requires at least two complete sets of MULTICARRIER transceiver equipment such as in the form of a broadband base transceiver system (BTS) to be located in each cell. Such a configuration results in dramatically increased hardware installation costs for each cell.

While this equipment is cost effective to deploy when a relatively large number of active mobile stations is expected in each cell, it is not particularly cost effective in most other situations. For example, during an initial system build-out phase, a service provider does not actually need to use large numbers of radio channels. It is therefore typically not possible to justify the cost of deploying complex MULTICARRIER broadband transceiver system equipment based only upon the initial number of subscribers. As a result, the investment in broadband MULTICARRIER radio equipment may not be justified until such time as the number of subscribers increases to a point where the channels are busy most of the time. Furthermore, many areas exist where the need for wireless communication systems is considerable, but where signal traffic can be expected to remain low indefinitely (such as in rural freeway locations or large commercial/industrial parks). Because only a few cells at high expected traffic demand locations (such as in a downtown urban location or a freeway intersection) will justify the initial expense of building out a network of high capacity broadband transceiver systems, the service provider is faced with a dilemma. He can build-out the system with less expensive narrowband equipment initially, to provide some level of coverage, and then upgrade to the more efficient equipment as the number of subscribers rapidly increases in the service area. However, the initial investment in narrowband equipment is then lost. Alternatively, a larger up front investment can be made to deploy the high capacity equipment at the beginning, so that once demand increases, the users of the system can be accommodated without receiving busy signals and the like. But this has the disadvantage of carrying the money cost of a larger up-front investment.

Some have proposed various techniques for expanding the service area of a master cell site. For example, the HPT Cell Site Expander product manufactured by 3 dbm, Inc., of Camarillo, Calif. consists of a base station translator which samples downlink signal traffic and translates it to a selected offset frequency. The offset carrier is transmitted to an expansion cell site via directional antennas. At the expansion cell site, the carrier is translated back to the original cellular channel and transmitted throughout the expansion cell site coverage area such as via an omnidirectional antenna. In the uplink direction, a cellular signal received, by the expansion cell site from a mobile unit is translated and then transmitted back to the base station translator, which in turn translates the signal back to its original carrier frequency.

However, such a device is designed only for use with analog-type cellular systems. A specific problem is encountered when attempting to extend the service area of a base station that uses Time Division Multiple Access (TDMA) signaling. Such a system makes use of a technique in which multiple voice or data channels are provided by dividing the access to each radio carrier frequency into carefully synchronized time slots. In order to properly demodulate a TDMA signal at the base station, a timing advance must be taken into consideration for each radio pulse received from the mobile stations. The timing advance serves to compensate for the differences in signal propagation time since the distance to the base station is different for each mobile station.

A TDMA signal transmitted in the uplink direction must therefore arrive at the Base Transceiver System with proper time alignment. If this is not the case, the signal pulses from the various mobile stations will collide, and it will not be possible for the Base Transceiver System to properly demodulate the signals. As such, it has in most instances been necessary to limit the nominal radius of a TDMA cell so that proper time alignment may be maintained.

An approach to extending the radius of a TDMA cell was disclosed in U.S. Pat. No. 5,544,171, issued to Goedecker and assigned to Alcatel N.V. This technique uses a fixed Base Transceiver System (BTS) that includes both a standard TDMA radio receiver and an additional auxiliary TDMA receiver. The auxiliary TDMA receiver receives and compensates the TDMA radio pulses from mobile stations located outside of the nominal cell radius. In this manner, interference between the TDMA signals received from a mobile station located outside of the nominal cell radius and a mobile station located within the nominal radius is avoided.

Unfortunately, the Goedecker technique is intended for use where both radio transceivers can be located entirely within the base station site. This permits the timing signals for the auxiliary TDMA receiver to be directly connected to the timing signals for the standard TDMA receiver. Thus, it would not be possible to directly apply the Goedecker technique to a remote repeater or translator arrangement, where the auxiliary TDMA receiver would have to be located many miles away from the base station site and such timing signal connection would not be possible.

Furthermore, while the HPT and Goedecker designs can be used to extend the radius of a single cell, they do not appear to suggest how to synchronize TDMA signals received from multiple mobile stations located in multiple cells simultaneously, nor do they suggest any form of random access control channel processing of initial uplink transmissions from mobile stations.

DESCRIPTION OF THE INVENTION

Objects of the Invention

It is an object of this invention to extend the available range in a cellular communication system beyond that which is normally available with Time Division Multiple Access (TDMA) air interfaces.

Another object is to provide for time delay compensation in TDMA systems without using multiple auxiliary receivers.

A further object is to compensate for the delay associated between a translating receiver deployed in a remote outlying cell and a host base station.

Yet another object is to provide for remote receiver time delay compensation in an uplink direction by measuring a delay observed in a downlink direction.

It is still another object of this invention to provide accurate diversity for Random Access Control Channel bursts in the initial uplink transmission.

SUMMARY OF THE INVENTION

Briefly, the invention is an architecture for a wireless communication system in which the cells are grouped into clusters. A host cell location is identified within each cluster and a MULTICARRIER broadband Base Transceiver System (BTS) is located at or near the host cell site.

Rather than deploy a complete suite of base station equipment at each remaining cell in the cluster, translating radio transceivers are located in the remote cells. These translating radio transceivers operate in-band, that is, within the frequencies assigned to the service provider.

The in-band translators operate in both an uplink and downlink direction. That is, uplink signals transmitted by a mobile station located in a remote cell are received at the in-band translator, translated to a different carrier frequency, and then transmitted to the host BTS. Likewise, downlink signals transmitted by the host BTS are first received by the in-band translator, translated to a different carrier frequency, and then repeated out to the mobile stations.

The host BTS measures a time delay for each in-band translator channel during a calibration mode. This is accomplished by setting the in-band translator to a "loopback" mode whereby the downlink signal received from the host BTS and transmitted to the mobile station is looped back to both of the uplink receive paths. A timing test signal in the form of, for example, a random access control channel (RACCH) burst is then transmitted by the host BTS such as would normally be sent by a mobile station. The RACCH burst is received by the in-band translator and looped back to the host BTS. The host BTS then demodulates the looped back signal, and measures the elapsed time interval between the transmission and reception of the loopback signal at the host BTS. A resulting time-of-arrival delay estimate as measured in the downlink path is then calculated and used by the host BTS to compensate for time alignments to be made in the time slots in the uplink signal during normal operation.

As a result, the limitation on the backhand range of the cell site normally associated with Time Division Multiple Access protocols is avoided. Indeed, the backhand range of such a system is limited only by the expected attenuation in the radio link.

In accordance with the invention, the in-band translator continually monitors the time slots and multiframe bursts in the signals transmitted by the BTS. A continuous, or watch-dog timer routine will execute each time that the time slot (physical channel) is detected. By counting subsequent time slots and multiframe bursts, the in-band translator is able to recognize when a specific time slot is capable of supporting a RACCH burst from the mobile station, and accordingly can provide diversity at the appropriate time slot.

As a result, the in-band translator compensates for timing differences of RACCH bursts between randomly positioned mobile stations and the host BTS.

BRIEF DESCRIPTION OF THE DRAWINGS

For a more complete understanding of the invention and its novel advantages and features, reference should be made to the accompanying drawings in which.

DETIALED DESCRIPTION OF A PREFERRED EMBODIMENT

Figure 1:
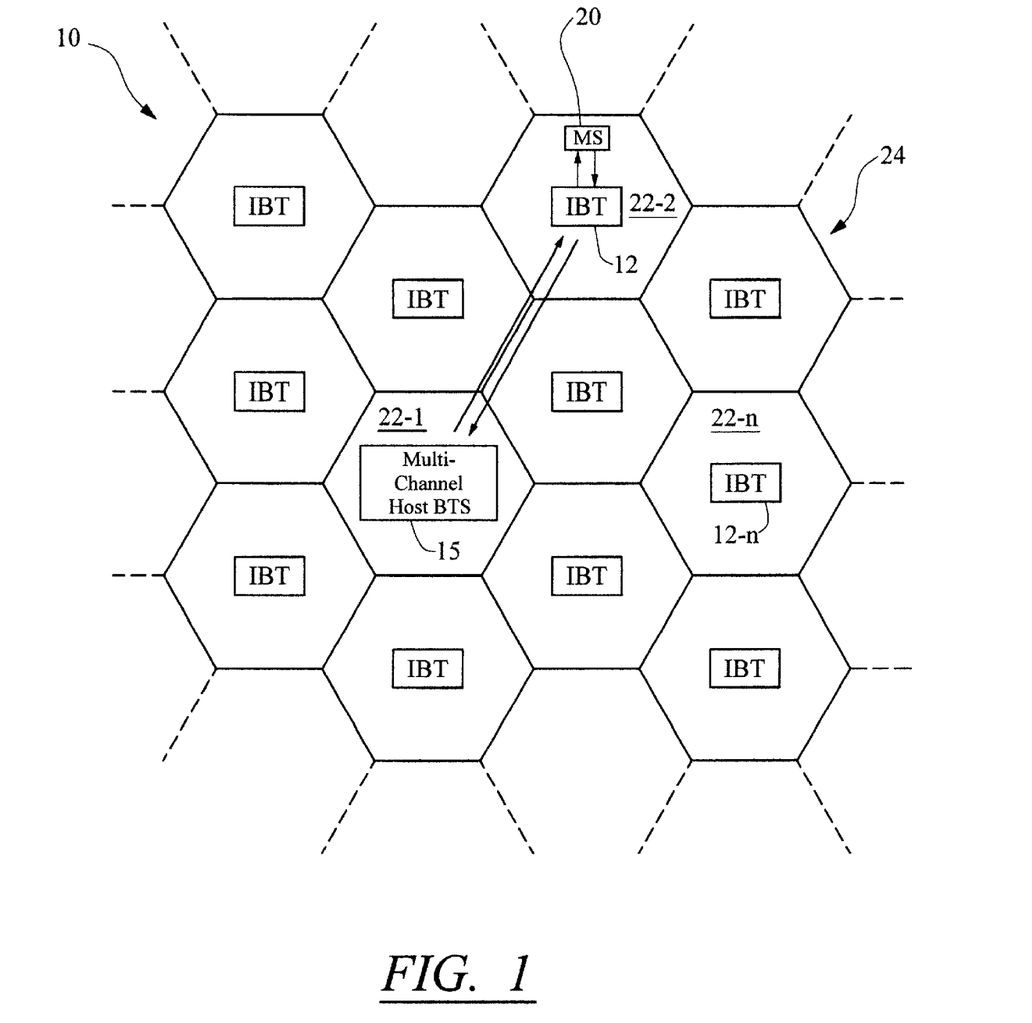
FIG. 1 is a view of a cell site cluster showing how a host Base Transceiver System (BTS), in-band translators, and mobile stations are deployed according to the invention.

FIG. 1 illustrates a wireless communication system 10 such as a Cellular Mobile Telephone, Personal Communication System (PCS), or similar system in which a timing adjustment scheme according to the invention enables proper demodulation of signals received from in-band frequency translator base stations deployed in peripheral cells.

The system 10 provides voice and or data communication between mobile stations 20 and a Public Switched Telephone Network (PSTN) via radio signals. In the particular embodiment of the invention being described, the radio signaling protocol, or "air interface," uses a Time Division Multiple Access (TDMA) technique such as the PCS-1900 standard promulgated by the Telecommunications Industry Association (TIA) in the United States [which is identical in relevant aspects to the Global System for Mobile Communication (GSM) standard promulgated in Europe and elsewhere by the European Telecommunication Standards Institute (ETSI)].

The in-band translators 12-1, 12-2, ..., 12-n ) are each located in what is normally to be approximately the center of a cell site 22 among a group or cluster 24 of cells. The in-band translators 12 receive radio signals from the mobile stations 20 located in their respective cells 22 and forward these signals to the associated host Base Transceiver System (BTS) 15. Likewise, radio signals originating at the host BTS 15 are forwarded by the translators 12 to the mobile stations 20. As a result, the signals associated with all of the mobile stations 20 located within the cluster 24 of cells 22-1, ..., 22-n are thereby processed at the host BTS 15.

The in-band translators 12 are "base stations" in the sense that they are each associated with a particular cell 22 and in that they each receive and transmit multiple signals from and to the mobile stations 20. However, the in-band translators 12 do not perform demodulation and modulation functions as does a conventional base station radio. Rather, they serve only to perform an in-band frequency-translation on uplink signals received from the mobile stations 20 and then direct such signals on a different frequency to the host BTS 15. In-bond translators also performing uplink diversity selection and automatic level control. The in-band translators 12 also perform the inverse function, to frequency translate downlink signals received from the host BTS 15-1 and then direct them to the mobile stations 20. The specific manner of translation will be discussed below in connection with FIG. 4.

Figure 2:
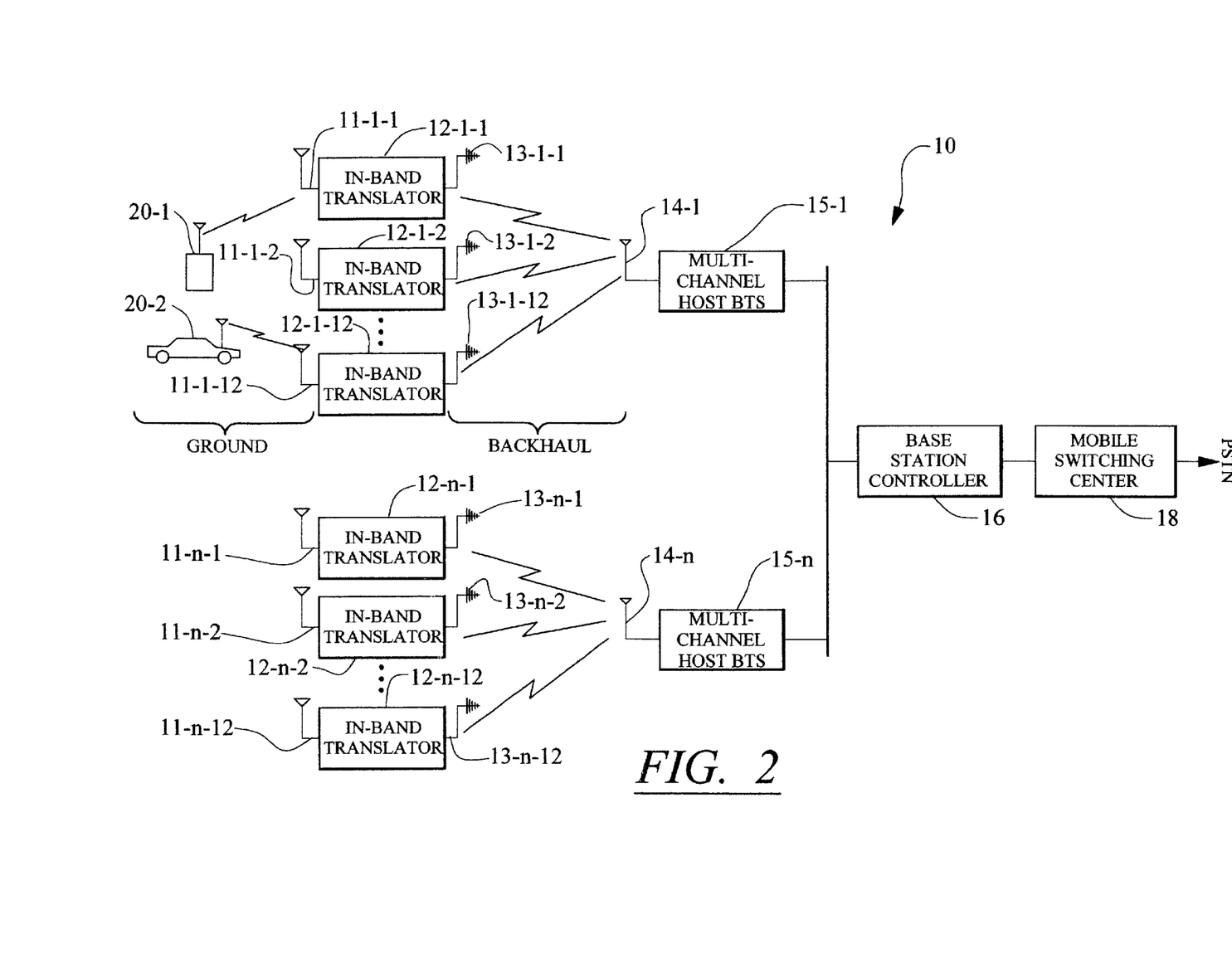
FIG. 2 is a block diagram of the components of the system.

Turning attention now to FIG. 2, the system 10 more particularly includes translator omni-directional antennas 11-1, ..., 11-n-2, 11-n-1, 11-n (collectively, the omni-directional antennas 11), in-band translator base stations 12-1-1, ... 12-n-1, ..., 12-n-12, translator directional antennas 13-1, ..., 13-n, host base station antennas 14-1, ..., 14-n, MULTICARRIER host Base Transceiver Systems (BTSs) 15-1, ... 15-n, one or more base station controllers 16, a mobile switching center 18, and mobile stations 20-1, 20-2.

The host BTSs 15-1, ..., 15-n are responsible for demodulating radio signals as well as for connecting such signals to the Public Switched Telephone Network (PSTN) through the mobile exchange 17. The host BTSs 15-1, ..., 15-n also modulate signals received from the PSTN through the mobile switching center 18 to format them for transmission over the air through the in-band translators 12. A particular host BTS 15-1 serves the multiple in-band translators 12-1-1, 12-1-2, ..., 12-1-n associated with a given cluster 24 of cells 22.

The Base Station Controller (BSC) 16, of which there may be more than one, performs a number of functions. The primary function is to manage the logical connections made between mobile stations 20 and the PSTN. In order to do so, the Base Station Controller 16 assigns transmit and receive radio carrier frequencies to each individual mobile station 20, in-band translator 12, and host BTS 15. Typically, there may be five to twenty BTSs 15-1, ..., 15-n serviced by a single Base Station Controller 16.

Figure 3:
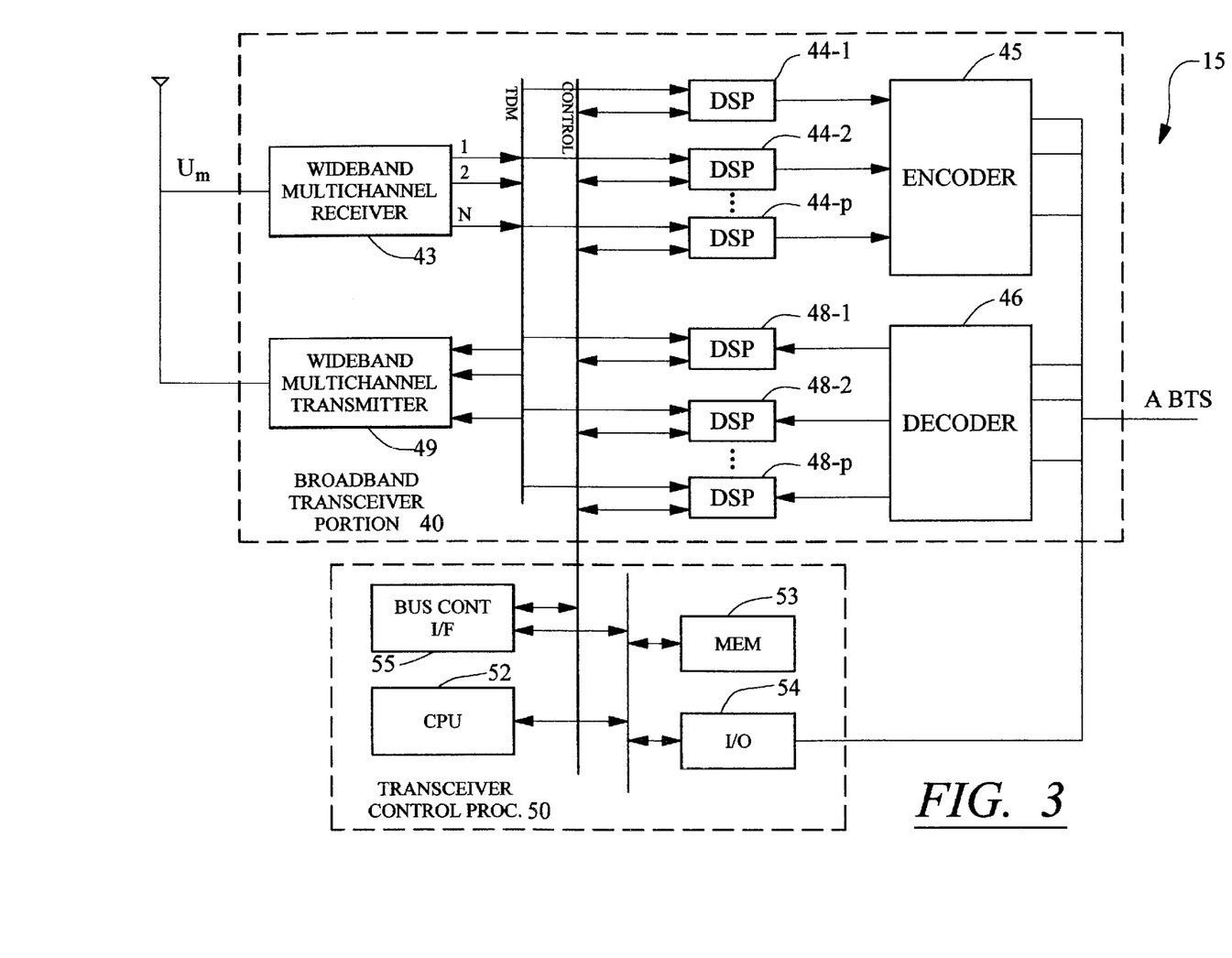
FIG. 3 is a detailed block diagram of a preferred embodiment of the MULTICARRIER host Base Transceiver System (BTS)

Turning attention now to FIG. 3, an exemplary host Base Transceiver System (BTS) 15 consists of a broadband transceiver portion 40 and transceiver control processor 50. The transceiver portion 40 acts as the interface for the radio channels Um, and preferably includes broadband multicarrier radio receiver and transmitter equipment to provide access to a number of contiguous receive and transmit channels simultaneously. The transceiver control processor 50 coordinates the operation of the transceiver portion 40 according to commands received from the Base Station Controller (BSC) 16 over an interface known as the "Abis interface" in GSM-type systems.

The broadband MULTICARRIER receiver 45 and transmitter 49 are broadband in the sense that they cover a substantial portion of the radio frequency bandwidth available to the service provider operating the system 10. For example, the broadband multicarrier receiver 43 may downconvert a 5 MegaHertz (MHz) bandwidth in the 1900–2000 MHz range which contains as many as 25 radio carrier signals, each having an approximately 200 kiloHertz (kHz) bandwidth. Each such carrier signal may typically contain up to eight (8) PCS-1900 channel signals of GSM-type format.

The transceiver portion 40 consists of a broadband MULTICARRIER receiver 43 and a broadband MULTICARRIER transmitter 49. The broadband MULTICARRIER receiver 43 in turn typically consists of 2 receive paths each containing a downconverter analog-to-digital (A/D) and one or more digital filter bank analyzers (not shown) which operate in a known manner to provide a plurality, N, of digital channel signals. A plurality of digital signal processors (DSPs) receive the digital channel signals and are programmed to operate as demodulators 44-1, 44-2, ..., 44-p (collectively demodulator DSPs 44). The demodulator DSPs 44 are connected to the broadband MULTICARRIER receiver 43 via a Time Division Multiplex (TDM) bus, which permits any of the N receiver outputs to be connected to any demodulator DSP 44. The demodulator DSPs 44 each provide a demodulated radio signal at its output. An encoder 45 may be used to encode these outputs of the demodulator DSPs 44 into a suitable signaling format for transport over the Abis or similar interface to the Base Station Controller (BSC) 16.

The transceiver 40 performs the reciprocal functions in the transmit direction. In particular, a decoder 46 and a plurality of modulator DSPs 48-1, 48-2, ..., 48-p, each of which receive one of the channel signals at an input, provide a plurality, N, of modulated signals to the broadband MULTICARRIER transmitter 49. The broadband MULTICARRIER transmitter 49, which is also connected to the TDM bus, consists of a digital filter bank synthesizer and a digital-to-analog converter. The broadband MULTICARRIER transmitter combines the N modulated signals to produce a broadband composite signal for transmission.

The transceiver control processor 50 is a computer, such as a microcomputer, and includes a central processing unit (CPU) 52, a memory 53, an input/output (I/O) interface 54, and bus controller interface 55. The I/O interface 54 is used to receive control signaling from the BSC 16 over the Abis or similar interface. To facilitate communication with the broadband transceiver 40, the transceiver control processor 50 makes use of the Time Division multiplex (TDM) bus controller 55.

The bus controller 55 ensures that outputs from the broadband MULTICARRIER receiver 43 are inserted in a defined order to particular inputs of the demodulator DSPs 44. Likewise, the bus controller 55 ensures that outputs of the modulator DSPs 48 are inserted in the defined order to the N inputs of the broadband MULTICARRIER transmitter 49. The bus controller 55 accomplishes this in a known fashion by using a bus time slot counter and time slot memory circuits to determine the order of connections.

A United States patent entitled "Transceiver Apparatus Employing Wideband FFT Channelizer with Output Sample Timing Adjustment and Inverse FFT Combiner for a MULTICARRIER Communication Network" issued Jul. 16, 1996 and which is assigned to AirNet Communications Corporation, the assignee of this application, describes the details of several embodiments of the MULTICARRIER BTS 15.

Figure 4:
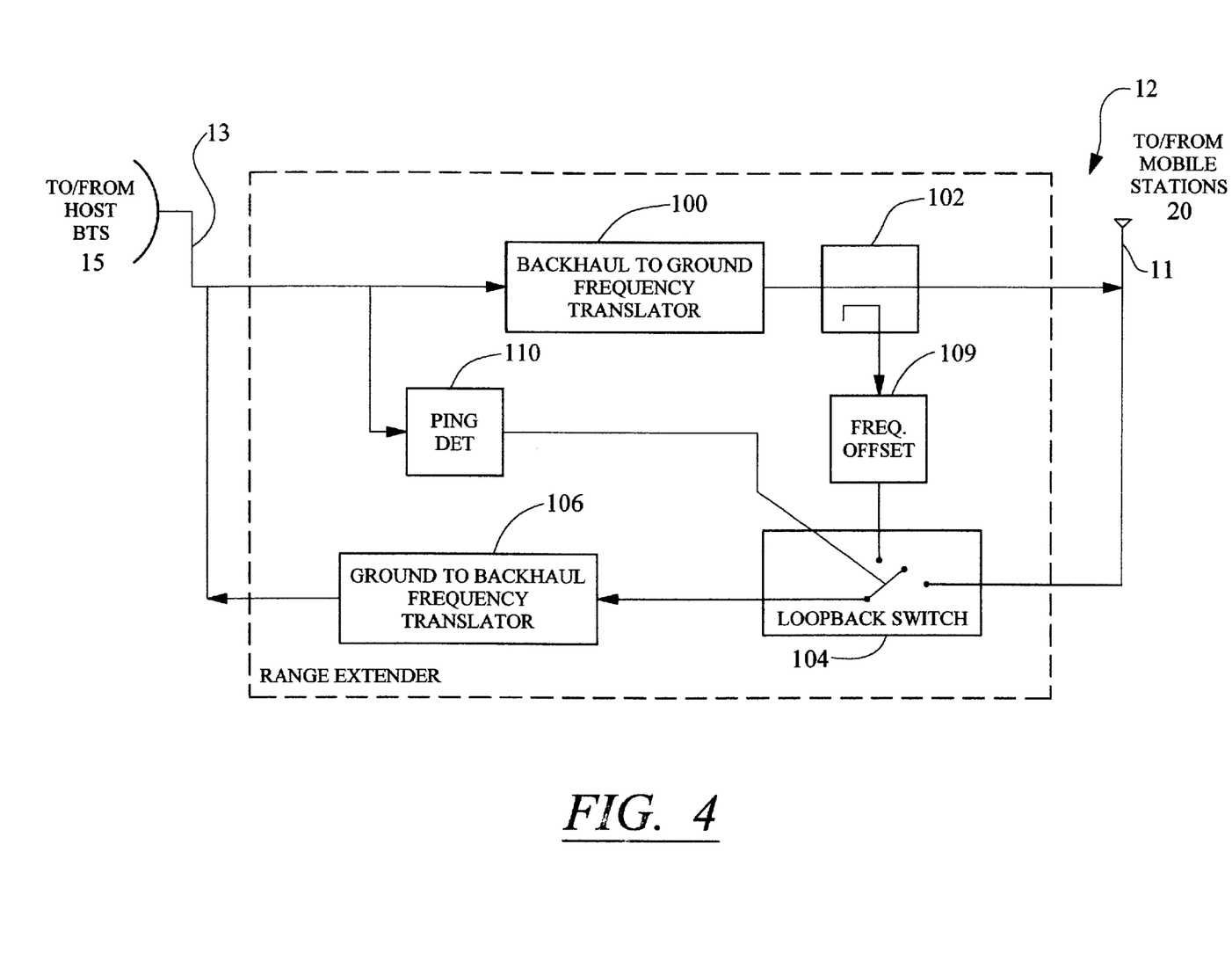
FIG. 4 is a block diagram of the in-band translator.

FIG. 4 is a block diagram of the details of one of the in-band translators 12 according to the invention. The in-band translator 12 consists of an omni-directional antenna 11, a directional antenna 13, a backhaul-to-ground frequency translator 100, a directional coupler 102, a loop-back switch 104, a ground-to-backhaul frequency translator 106, a ping signal detector 110, a frequency shifter 109, and a diversity detector 108.

The backhaul-to-ground translator 100 receives downlink signals from the directional antenna from the host BTS 15. The backhaul-to-ground translator 100 shifts the carrier frequency of such signals to a different frequency which is within the bandwidth of the frequency allocated to the operator of the system 10. In a PCS-1900 system, for example, signals may be received from the host BTS 15 in a range of, say, 1975–1990 MHz. As previously described, each signal is, a 200 kHz bandwidth signal. The signal is then frequency translated to a different carrier frequency in the 1975–1990 MHz licensed bandwidth. The translated downlink signal is then sent through the directional coupler 102 out to the omni-directional antenna 11, and from there, on to the mobile stations 20.

In the receive direction, uplink radio carrier frequency signals received on the omni-directional antenna 11 from the mobile stations 20 are sent through the ground-to-backhaul translator 106 which performs a carrier frequency translation. For example, in the PCS 1900 band, signals may be received in a range from 1895–1910 MHz and shifted to a different carrier frequency in this same licensed bandwidth. The output from the ground-to-backhaul translator 106 is then connected to the directional antenna 13 for transmission back to the host BTS 15.

The loopback "ping" signal detector 110 is arranged to detect and initiate loop back when a "ping" signal is sent by the BTS 15. Upon first detecting the "initiate loop back" ping signal, the ping signal detector 110 causes the loop back switch 104 to be operated to connect downlink signals received on the directional backhaul antenna through the backhaul-to-ground translator 100, the coupler 102, the loop back switch 104, and ground-to-backhaul translator 106. While the translator 12 is in this loop back mode, a frequency offset circuit 109 adjusts for the difference in the downlink and uplink carrier frequency. This offset is (1975 minus 1895) or 80 MHz in the PCS-1900 example being described herein.

When a subsequent terminate loop back signal is received by the "ping" signal detector 110, the loop-back switch 104 is operated to return the translator 12 to the normal mode.

In order to perform a time-of-arrival adjustment, the in-band translator 12 having a loop-back mode is used in conjunction with the host BTS 15. In particular, the BTS control processor 52 (FIG. 3), includes a process that tracks the activity for each in-band.translator 12 which it controls.

The process proceeds generally as follows. When there has been no radio frequency signal transmitted to or by a mobile station 20 on the carrier frequency associated with a particular in-band translator 12 for a period of time, such as, for example, five (5) minutes, then the control processor 52 sends a command to the transmit digital signal processor (DSP) 48 associated with that particular radio channel. That DSP 48 in turn causes the "initiate loop back" ping signal to be sent to the in-band translator 12. The ping signal may, for example, take the form of a constant baseband tone transmitted for a predetermined number of successive time slots. After waiting for a period of time sufficient to ensure that the in-band translator 12 has been placed into loop back mode, the DSP 48 then causes a timing test signal, such as a Random Access Control Channel (RACCH) burst to be sent to the translator 12. The corresponding receive DSP 44 is then initiated to detect the RACCH burst and to measure the round-trip time required for the RACCH burst to be looped back to the host BTS 15. In this manner, the host BTS 15 can determine an actual propagation time between the in-band translator 12 and the base station 15, by dividing the observed loop back time by two.

After determining the propagation time, the loop back termination signal (which may be in the form of a tone that is different from the initiate loop back tone) causes the ping return detector 110 to return the loop back switch 104 to the normal mode. The process may be repeated and measurements averaged if desired.

Figure 5:
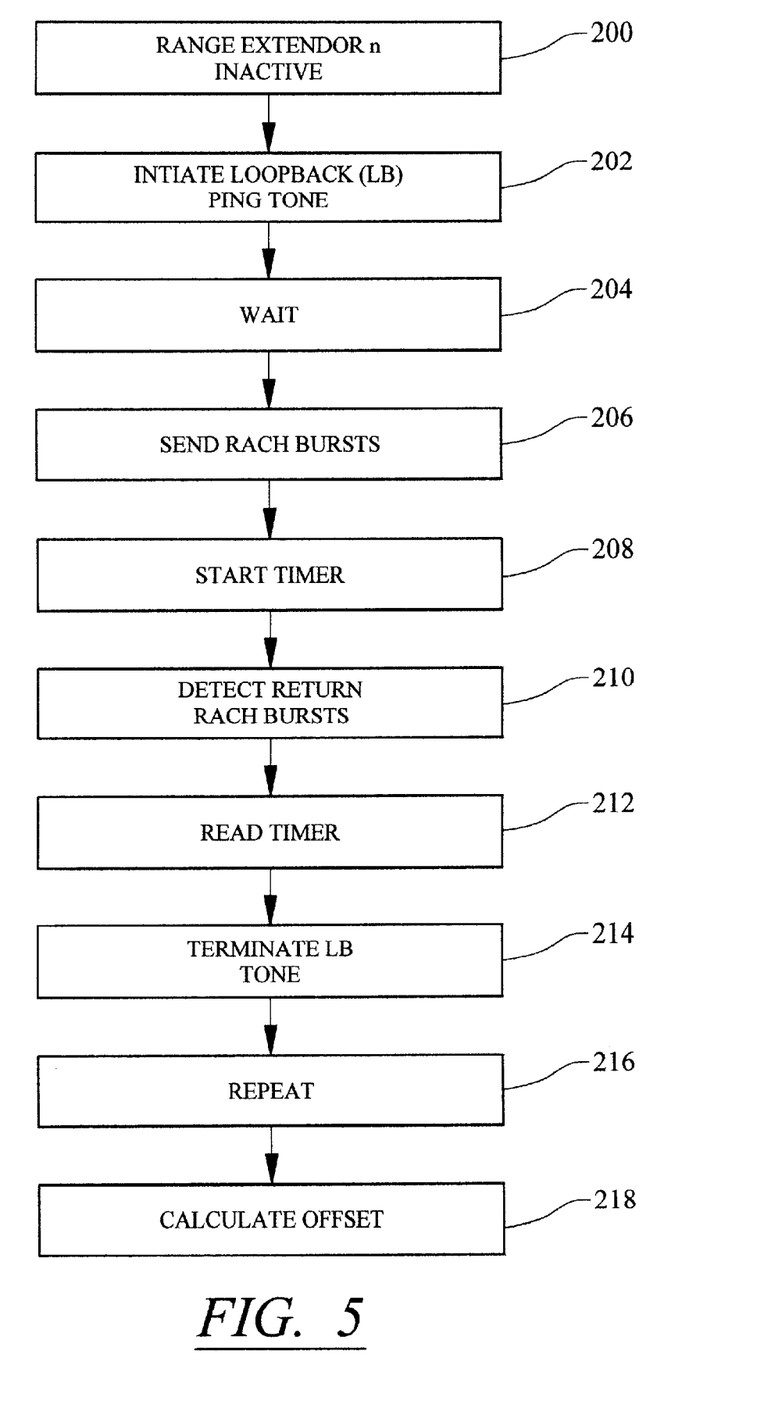
FIG. 5 is a flow chart of the sequence of steps performed by a transmit control processor in the host BTS during a time-of-arrival measurement procedure.

FIG. 5 contains a flow chart of the steps performed by the BTS control processor 50 during the time-of-arrival measurement process for a particular translator 12. In a first step 200, a particular one of the in-band translators 12 has been detected as being inactive for the pre-determined period of time. In a next step 202, the associated transmit DSP 48 is requested to send "initiate loop back" ping signal. The following step 204 causes the processor 50 to enter a wait state for a pre-determined time frame, after which in step 206 DSP 44 is asked to send the RACCH burst signals.

In the next step 208, a timer is started with step 208 preferably occurring concurrently with step 206. In step 210, the return RACCH bursts are reported as being detected by the associated receiving DSP 44. In step 212, the timer data is read. In step 214, the "terminate loop back" ping signal is transmitted down to the in-band translator 12. In the final step 218, the offset time "t" is calculated by averaging the results of the repeated timing interval measurements and dividing by two. The process is repeated for each of the translators in the cluster 24 to determine a time interval measurement for each.

Figure 6:
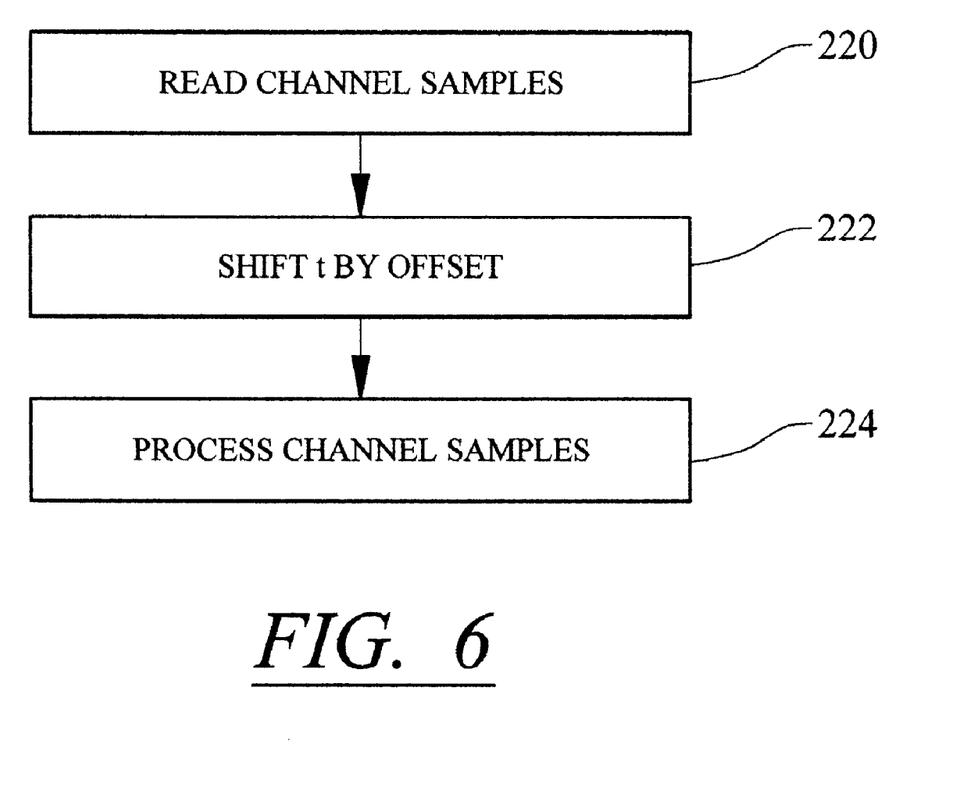
FIG. 6 is a flow chart of the sequence of steps performed by a receive digital signal processor in the host BTS while processing TDMA signal samples to compensate for the measured time-of-arrival.

FIG. 6 illustrates a sequence of steps performed by a receive DSP 44 during normal operation in connection with the invention. In a first step 220, the channel samples are read as in the normal demodulation processes as previously described. In a next step 222, the channel sample timing references are offset by the time "t" as determined from the process for the associated translator 12, as previously described in FIG. 5. In the next step 224, the channel samples are then further processed as for normal Time Division Multiple Access (TDMA) demodulation.

It is now understood how the invention is able to compensate for the propagation delay between the in-band translator 12 and the host BTS 15. Through computer simulations and actual test deployments of an implementation of the invention it has been shown that with a single host BTS 15 and twelve cells 22, coverage can be provided of approximately 1000 square kilometers by a single BTS 15 which would previously have been limited to a radius of 35 kilometers.

This is accomplished by determining a fixed timing offset parameter for each in-band translator, by setting the in-band translator into a loop back mode via a transmission of a special loop back signal, transmitting an access burst as would normally be sent by a mobile unit, measuring the round-trip time-of-arrival delay at the BTS, and then using this measured time-of-arrival delay to determine an offset to be used to adjust the normal mode TDMA-demodulation processing.

In order to perform the necessary random access control channel (RACCH) processing, the in-band translator 12 having a T3 counter 112 is used in conjunction with the host BTS 15. In particular, the BTS control processor 52 (FIG. 3), includes a process that tracks the activity for each in-band translator 12 which it controls.

Figure 7:
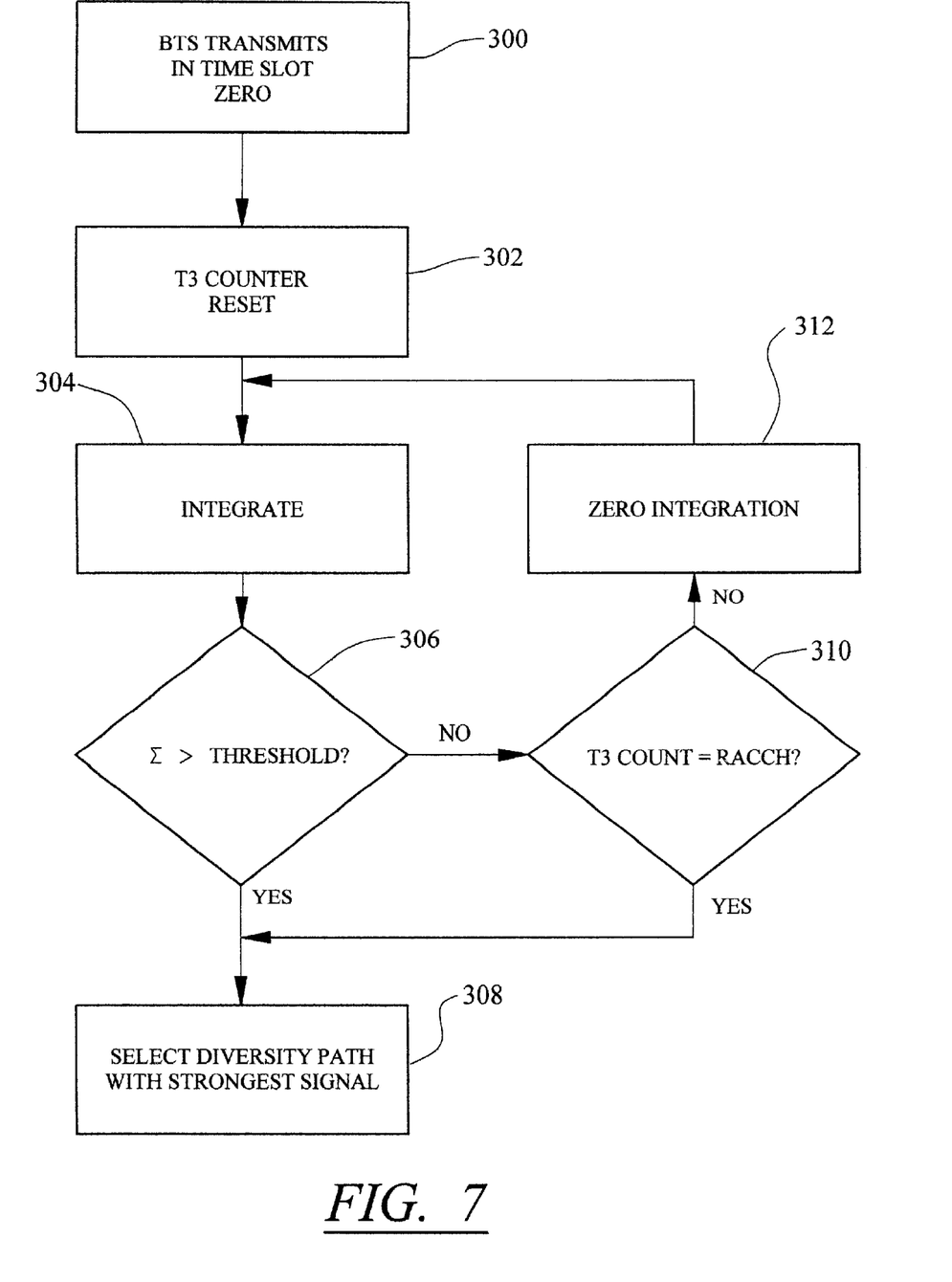
FIG. 7 is a flow chart of the sequence of steps performed during the random access control channel processing.

The process proceeds generally as follows for a GSM-type signal, as depicted in FIG. 7: the BTS control processor 52 will always transmit a Channel Combination V frame structure 300 in time slot zero of the TDMA frame. The detection of time slot zero initiates step 302, where the T3 counter resets and begins counting down signaling frames of the 51 multiframe control structure on physical channel 0. Then in step 304 the in-band translator 12 performs a slot-by-slot diversity selection by measuring and integrating the energy during the first several bit periods for each diversity path. The integrated value is compared to a programmable threshold in step 306. If an integration exceeds the threshold, then it is treated as a Normal Burst, and the path with the strongest signal as determined by the integration step is selected in step 308. The programmable threshold is designed so that the integration of the first several bit periods of a RACCH burst will not exceed the threshold, due to the shorter duration and the delayed onset of the RACCH bursts relative to the Normal Bursts. This programmable threshold can be a fixed threshold, or it can be made adaptive.

If the integration fails to exceed the programmable threshold, thereby indicating a RACCH burst, and in step 310 the T3 counter 112 indicates a time slot that can support a RACCH burst, then the strongest available diversity path is selected in step 310, thereby synchronizing the RAACH burst with the BTS.

If in step 312 the T3 counter 112 indicates a time slot other than a RACCH burst time slot when the integration fails to exceed the programmable threshold, then the integration is zeroed or "dumped" in step 312, and a successive integration step 304 is performed. This "integrate and dump" process is repeated until either a diversity selection is made, or a preset maximum number of "integrate and dump" intervals have been reached.

In this manner, the in-band translator 12 can accommodate timing differences in the RACCH bursts from mobile stations 20 which result from the varying distances between the mobile stations 20 and the host BTS 15. Thus, selective diversity is accomplished not only for Normal Bursts, but also for the shorter duration RACCH bursts, with no possibility of corrupting the Normal Bursts.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A cellular communication system consisting of a plurality of cells, the plurality of cells being located substantially adjacent one another, and the cellular communication system operating over a specified frequency range, the cellular communication system making use of a frequency allocation plan that arranges the cells into clusters, the system comprising:

a home base station including a MULTICARRIER broadband base transceiver system for receiving and transmitting multiple radio signals on multiple respective carrier frequencies, including a demodulator for demodulating said received radio signals and for coupling demodulated signals to a switching means, and means for modulating signals received from the switching means and coupling them for radio transmission on the multiple carrier frequencies;

a plurality of in-band translator means, each of said plurality of in-band translator means located in a respective one of said plurality of cells in the cluster, each in-band translator means further including first translator means for receiving a first uplink ground signal from a mobile station located in the respective one of said plurality of cells and translating a carrier frequency of said first uplink ground signal to a first divergent carrier frequency within the specified radio frequency range to produce a first backhaul signal and then connecting said first backhaul signal for transmission to the home base station means, second translator means for receiving a second downlink backhaul signal from said home base station means and translating a carrier frequency of said second downlink backhaul signal to a second divergent carrier frequency within the specified radio frequency range, to produce a second downlink ground signal, and then connecting said second downlink ground signal for transmission to said mobile station, said translator means additionally including loop back means selectively actuable to select a loop back mode during which said downlink signal is coupled to an input of said uplink input, random access control channel diversity selection means for receiving said first uplink ground signal containing a random access control channel burst, detecting the random access control channel burst in said first uplink ground signal, and synchronizing said random access control channel burst with said MULTICARRIER broadband BTS.

2. A system as in claim 1, wherein said first uplink ground signal further contains a plurality of Normal Bursts, the system further including RACCH burst detector means for distinguishing said RACCH burst in said first uplink ground signal from said plurality of Normal Bursts.

3. A system as in claim 2 wherein said RACCH burst detector means integratively measures the energy during a plurality of bit periods for each diversity path in said first uplink ground signal.

4. A system as in claim 2 wherein said RACCH burst detector means integratively measures the energy during a plurality of bit periods for each diversity path in said first uplink ground signal, and compares said integratively measured energy against a preprogrammed threshold value.

5. A system as in claim 4 wherein the preprogrammed threshold is replaced by an adaptive threshold.

* * * * *